(12) United States Patent
Lee et al.

(10) Patent No.: US 11,168,822 B2
(45) Date of Patent: Nov. 9, 2021

(54) CONNECTOR ASSEMBLY FOR HOSE CONNECTION OF HOT WATER MAT

(71) Applicant: KYUNGDONG NAVIEN CO., LTD., Pyeongtaek-si (KR)

(72) Inventors: Yong Seok Lee, Seoul (KR); Seung Kil Son, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 532 days.

(21) Appl. No.: 16/117,883

(22) Filed: Aug. 30, 2018

(65) Prior Publication Data
US 2019/0162345 A1 May 30, 2019

(30) Foreign Application Priority Data

Nov. 30, 2017 (KR) .................. 10-2017-0162512

(51) Int. Cl.
*F16L 37/14* (2006.01)
*F28F 3/12* (2006.01)
*F16L 37/56* (2006.01)
*F16L 37/10* (2006.01)

(52) U.S. Cl.
CPC ............. *F16L 37/142* (2013.01); *F16L 37/56* (2013.01); *F28F 3/12* (2013.01); *F16L 37/10* (2013.01)

(58) Field of Classification Search
CPC ......... F16L 37/10; F16L 37/142; F16L 37/56; F28F 3/12
See application file for complete search history.

(56) References Cited

U.S. PATENT DOCUMENTS

| 6,871,878 B2 * | 3/2005 | Miros ................... A61F 7/02 285/1 |
| 7,464,966 B2 * | 12/2008 | Miyajima ............... F16L 5/10 285/124.3 |
| 7,731,244 B2 * | 6/2010 | Miros ................ A61M 39/105 285/317 |
| 9,388,929 B2 * | 7/2016 | Lewis ................ A61B 5/02141 |
| 2015/0115598 A1 * | 4/2015 | Lombardi, III ..... F16L 37/0985 285/124.1 |

FOREIGN PATENT DOCUMENTS

KR    20-2014-0004236 U    7/2014

* cited by examiner

*Primary Examiner* — James M Hewitt, II
(74) *Attorney, Agent, or Firm* — Stein IP, LLC

(57) ABSTRACT

An embodiment of the present subject matter includes: a plurality of sockets connected to a plurality of hoses through which hot water is supplied and returned, and formed in a detachable structure; and clips provided outside the plurality of sockets with a clearance to support the plurality of sockets so as to have a degree of freedom.

14 Claims, 13 Drawing Sheets

D-D

E-E

CONNECTOR ASSEMBLY FOR HOSE CONNECTION OF HOT WATER MAT

CROSS-REFERENCE TO RELATED APPLICATION

This application claims priority to and the benefit of Korean Patent Application No. 10-2017-0162512, filed on Nov. 30, 2017, the disclosure of which is incorporated herein by reference in its entirety.

BACKGROUND

1. Field of the Invention

The present invention relates to a connector assembly for hose connection of a hot water mat, and more particularly, to a connector assembly for hose connection of a hot water mat configured to interconnect or separate a plurality of hoses provided on a mat side to supply hot water and a plurality of hoses provided on a hot-water circulation system side to return the hot water.

2. Discussion of Related Art

Generally, a hot water mat is composed of a hot-water circulation system configured to heat water and supply hot water and a mat heated by using the hot water heated by the hot-water circulation system as a heat source.

A plurality of hoses are connected to the hot-water circulation system and the mat so that hot water is supplied and returned, and a connector assembly for hose connection of a hot water mat is used for connecting or separating the plurality of hoses provided on the hot-water circulation system side and the mat side.

Generally, the connector assembly includes a socket connected to a hose on a mat side, and a plug connected to a hose on a hot-water circulation system side and attached to and detached from the socket. Also, a sealing member such as an O-ring is coupled to an outer surface of the plug so that the sealing member is pressed on an inner surface of the socket when the socket and plug are assembled, thereby preventing leakage of water.

As an example of the prior art related to such a connector assembly, in a Korean Utility Model Registration Application No. 20-0473859, there is disclosed a hose coupling joint for a hot-water circulation system employing a one-touch method in which a plurality of sockets and a plurality of plugs each have an integrated structure.

However, when each of the plurality of sockets and the plurality of plugs has the integrated structure as described above, degrees of parallelism of the plurality of plugs may not coincide with each other due to manufacturing tolerances or assembly tolerances, and in this case, the socket and the plug may not be assembled in parallel to each other but may be assembled with one side inclined when assembling the sockets and the plugs by inserting each of the plurality of plugs into a corresponding one of the plurality of sockets. Accordingly, an inclined side of a sealing member coupled to an outer surface of the plug and an opposite side to the inclined side may have different degrees of compression so that a gap may be formed between the plug and an inner surface of the socket at a side in which the degree of compression of the sealing member is relatively small, thereby causing a leakage phenomenon.

SUMMARY OF THE INVENTION

The present invention provides a connector assembly for hose connection of a hot water mat which may prevent leakage of water as plugs and sockets are normally assembled even when degrees of parallelism of the plurality of plugs do not coincide with each other.

According to an aspect of the present invention, there is provided a connector assembly for hose connection of a hot water mat including: a plurality of sockets connected to a plurality of hoses, through which hot water is supplied and returned, formed in a detachable structure; and clips provided outside the plurality of sockets with a clearance to support the plurality of sockets so as to have a degree of freedom.

The clips may include an upper clip provided on a circumference of an upper outer surface of the plurality of sockets and a lower clip provided on a circumference of a lower outer surface of the plurality of sockets and coupled to the upper clip.

An upper support groove may be formed in the upper clip and support the upper outer surface of the plurality of socket with a clearance, and a lower support groove may be formed in the lower clip and support the lower outer surface of the plurality of sockets with a clearance.

A support protrusion may be formed on an outer surface of the socket, and a support groove, into which the support protrusion is inserted with a clearance, may be formed in the clip.

The connector assembly for hose connection of a hot water mat may further include an upper cover configured to cover the upper clip and an upper portion of the socket, and a lower cover, which is coupled to the upper cover, configured to cover the lower clip and a lower portion of the socket.

One side portion of the socket may be mounted on an inner surface of a hole formed in one side portion of the lower cover with a clearance.

A first attachable/detachable groove and a first attachable/detachable protrusion, which are detachably formed on the upper clip and the upper cover at positions corresponding to each other, may be inserted into and coupled with each other.

A second attachable/detachable groove and a second attachable/detachable protrusion, which are detachably formed on the lower clip and the lower cover at positions corresponding to each other, may be inserted and coupled to each other.

A plurality of plugs connected to a plurality of hoses, through which the hot water is supplied and returned, may be detachably inserted into and assembled with the sockets, and the connector assembly for hose connection of a hot water mat may further include a separating and coupling device which is held by the plug when the sockets and the plugs are assembled to each other and releases the holding state with the plugs when the sockets and the plugs are separated from each other.

The separating and coupling device may include a pushing portion, and a locking portion extending from the pushing portion that is provided to be lifted or lowered through the socket and formed with a hole through which one side portion of the plug passes.

The locking portion may be inserted into a guide groove, which is formed in the socket, with a clearance so that the plurality of sockets are supported with a degree of freedom.

When the pushing portion is moved upward, a lower end portion of the locking portion positioned at a bottom of the hole may be held by a holding groove formed on an outer surface of the plug to maintain a state in which the sockets and the plugs are assembled to each other, and when the pushing portion is moved downward, the lower end portion of the locking portion may be moved to an outside of the holding groove so that the sockets and the plugs are in a detachable state.

A step may be formed in the pushing portion to limit an upward movement range of the pushing portion while moving upward by being held by a holding protrusion formed in the guide groove formed at one side of the sockets. The pushing portion may be held by the upper cover while moving upward so that the upward movement range of the pushing portion is limited.

An inclined surface may be formed on the lower end portion of the locking portion, and when the sockets and the plugs are assembled to each other, the outer surface of the plug is moved along the inclined surface and the lower end portion of the locking portion is moved upward by the elastic force of the elastic member and held by the holding groove.

A plurality of plugs connected to a plurality of hoses through which the hot water is supplied and returned may be detachably inserted into and assembled to the sockets, and when the sockets and the plugs are assembled to each other, the socket connected to the plug may be displaced in a direction parallel to the plug due to a degree of freedom and assembled in an aligned state.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, configurations and operations of embodiments of the present invention will be described in detail with reference to the accompanying drawings. In this specification, 'one side' refers to a direction toward a plug (left side with reference to FIGS. 11 and 12), and 'the other side' refers to a direction toward a socket (right side with reference to FIGS. 11 and 12).

Referring to FIGS. 1 to 15, a connector assembly for hose connection of a hot water mat 1 (hereinafter, abbreviated as 'connector assembly') according to the present invention includes a first connector 100 connected to a mat (not shown) side of the hot water mat. A second connector 200, which is connected to a hot-water circulation system (not shown) side of the hot water mat, is detachably assembled to one side of the first connector 100.

A plurality of hoses (not shown) are connected to the first connector 100 and the second connector 200 for supplying and returning hot water circulating the mat and hot-water circulation system of the hot water mat.

Figure 14:
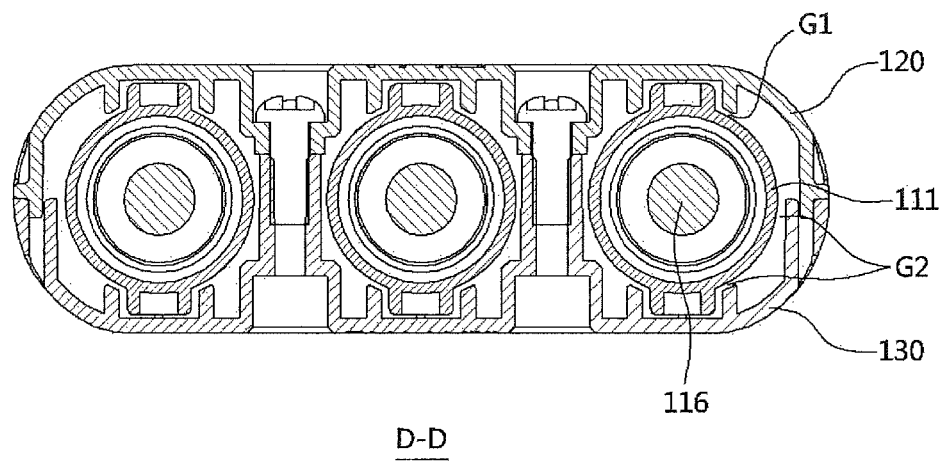
FIG. 14 is a cross-sectional view taken along line D-D of FIG. 10 illustrating a clearance formed between a socket body and the upper and lower clips.
Figure 15:
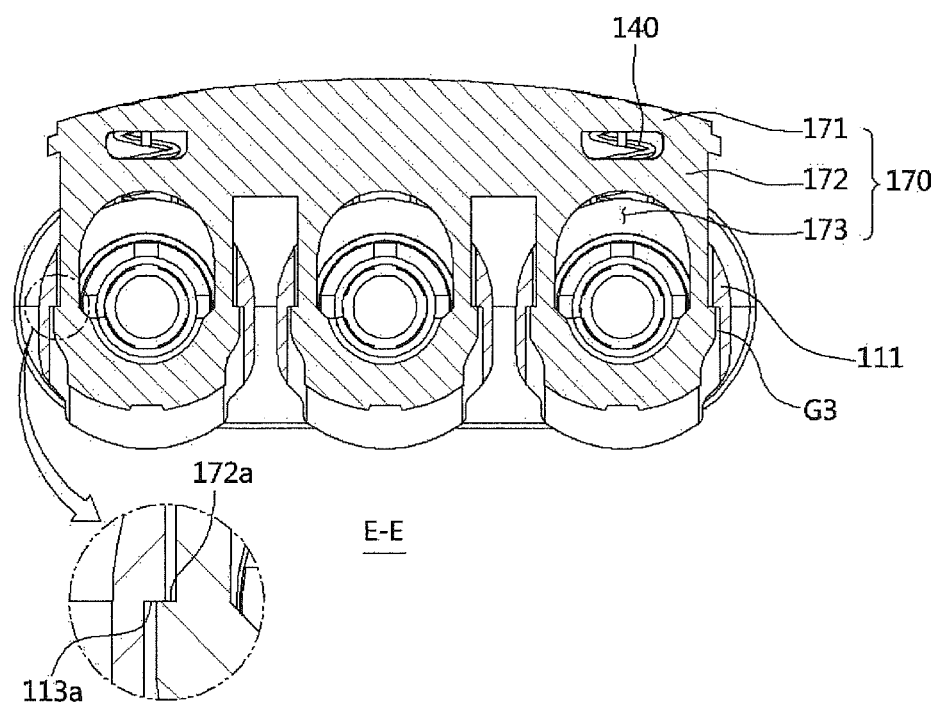
FIG. 15 is a cross-sectional view taken along line E-E of FIG. 10 illustrating a clearance formed between the socket body and the separating and coupling device.

The first connector 100 includes: a plurality of sockets 110 (110a, 110b, and 110c) formed in a detachable structure; an upper clip 120 and a lower clip 130, which are assembled at upper and lower portions of the sockets 110 with predetermined clearances G1 and G2 (see FIG. 14); an upper cover 150 and a lower cover 160 covering the upper and lower portions of the sockets 110 on which the upper clip 120 and the lower clip 130 are assembled; a separating and coupling device 170, which is provided to be lifted or lowered on one side portion of the upper cover 150, is held by plugs 210 when the sockets 110 and the plugs 210 are assembled to each other, releases the holding state with the plugs 210 when the sockets 110 and the plugs 210 are separated from each other, and is assembled with the sockets 110 with a predetermined clearance G3 (see FIG. 15).

The second connector 200 may include a plurality of plugs 210 (210a, 210b, and 210c) formed in an integrated structure by plug bodies 211 and 213.

As one example, the sockets 110 may include a first socket 110a, a second socket 110b, and a third socket 110c which are injection molded in a detachable manner. The second socket 110b may be connected to a hot water supply tube (not shown) configured to supply hot water from the hot-water circulation system toward the mat side, and the first socket 110a and the third socket 110c may be connected to first and second hot water return tubes (not shown) through which the hot water is returned to the hot-water circulation system side from the mat. However, the number of the sockets 110 and the structure in which the sockets 110 are connected to the hot water supply tube and the hot water return tubes may be changed according to the configuration of a boiler.

Figure 7:
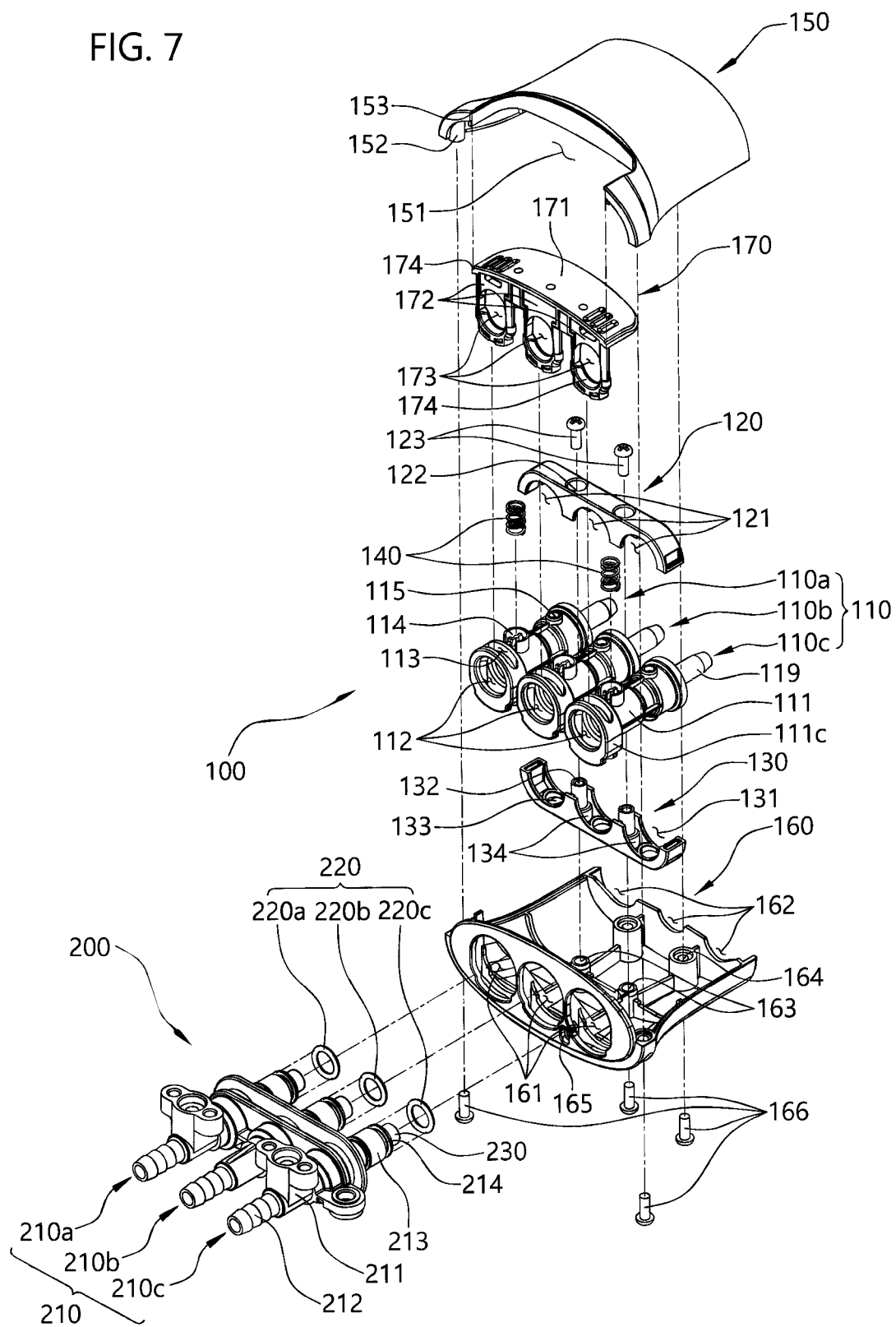
FIG. 7 is an exploded perspective view of the connector assembly for hose connection of a hot water mat according to the present invention.
Figure 11:
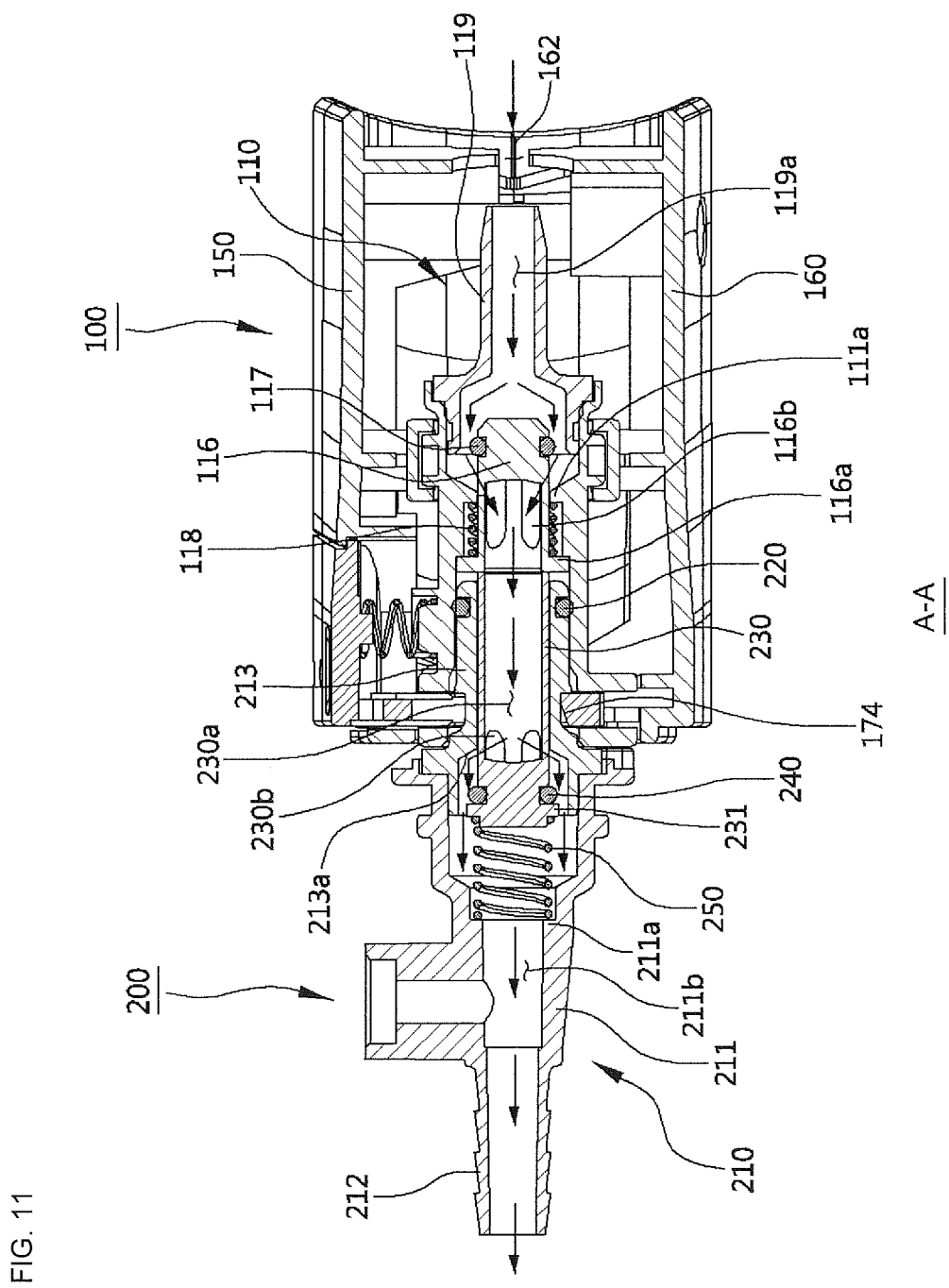
FIG. 11 is a cross-sectional view taken along line A-A of FIG. 2 illustrating a state in which the first connector and the second connector are coupled to each other.
Figure 12:
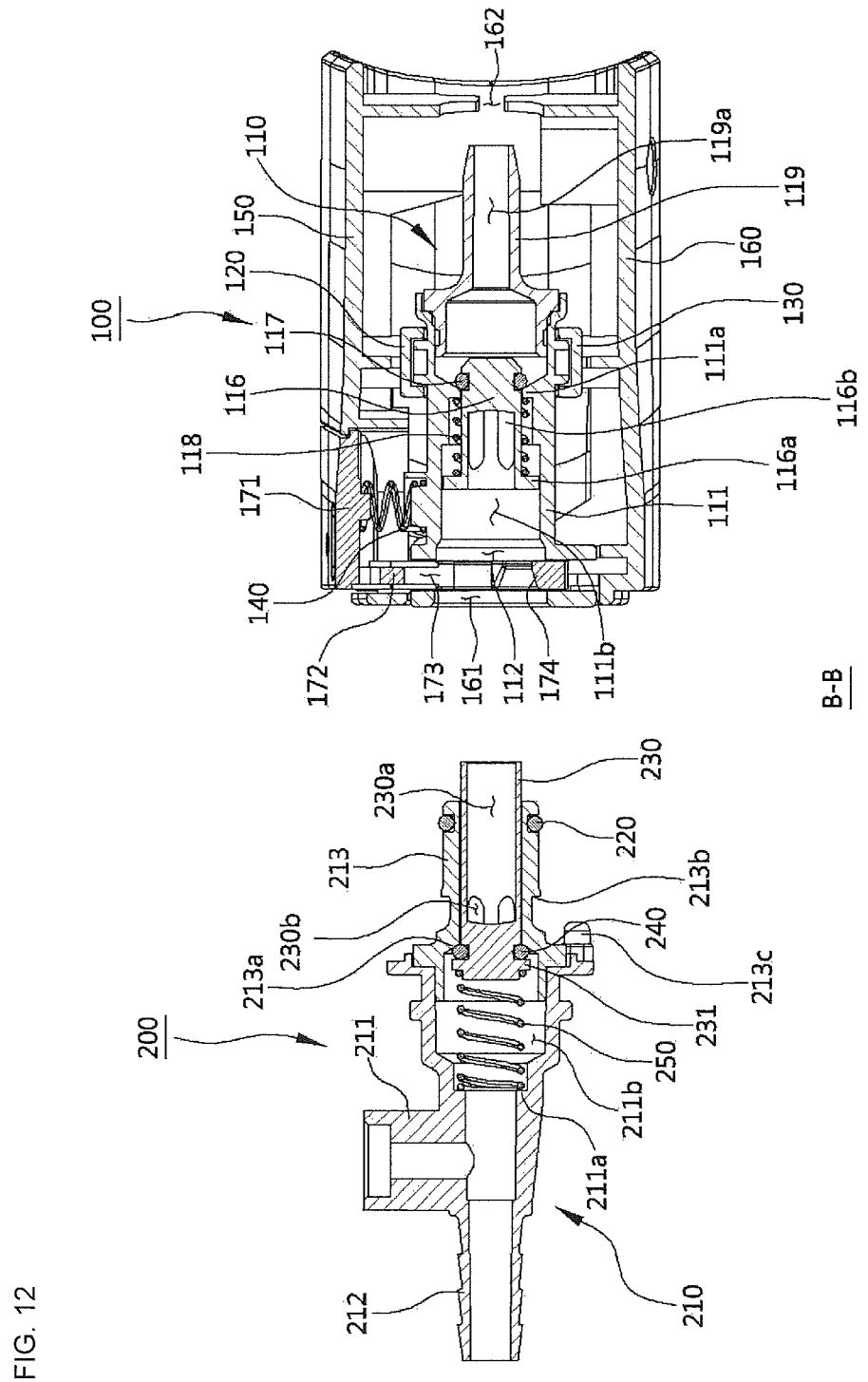
FIG. 12 is a cross-sectional view taken along line B-B of FIG. 4 illustrating a state in which the first connector and the second connector are separated from each other.

Referring to FIGS. 7, 11 and 12, the sockets 110 include a socket body 111 which forms an exterior thereof. A hole 112 into which a second plug body 213 of the plug 210, to be described later, is inserted is formed on one side of the socket body 111. A guide groove 113 is vertically formed on an upper side portion of the socket body 111 so that a locking portion 172 of the separating and coupling device 170, which will be described below, may be lifted or lowered therethrough. The separating and coupling device 170 is inserted into the guide groove 113 with the predetermined clearance G3 (see FIG. 15).

A support groove 114 configured to support a lower end portion of an elastic member 140, which will be described below, is formed on one side of the guide groove 113 on the upper portion of the socket body 111, and a support protrusion 115, which is inserted and supported in a support groove 133 formed in the upper clip 120 and the lower clip 130 to be described below, is formed on upper and lower portions of the other side of the socket body 111. The support protrusion 115 is inserted into an inner side of the support groove 133 with a predetermined clearance to support the socket 110 so that positions of the sockets 110 are prevented from being displaced.

Hose insertion tubes 119, which are inserted into a plurality of hoses for supplying and returning the hot water, are coupled to the other end of the socket body 111.

An inner space 111b of the socket body 111 is provided with an opening/closing member 116 configured to open or close a flow path of the hot water. A holding protrusion 111a protruding inward by a predetermined length is formed on an inner surface of the socket body 111, and a sealing member 117 is coupled to an outer surface of the other side portion of the opening/closing member 116 and brought into close contact with the holding protrusion 111a to maintain watertightness. The opening/closing member 116 has one side end on which a flange-shaped holding portion 116a is formed, and an elastic member 118 having both ends supported by the holding portion 116a and the holding protrusion 111a is provided therebetween. The one side end of the opening/closing member 116 is open to communicate with the inner space 111b of the socket body 111, and an opening portion 116b for communicating the hot water is formed in one side portion region of the opening/closing member 116.

The operation of opening and closing the flow path by the opening/closing member 116 will be described below.

The upper clip 120 and the lower clip 130 are configured to simultaneously support the plurality of sockets 110 (110a, 110b, and 110c) having a detachable structure so that the plurality of sockets 110 have a degree of freedom.

An upper support groove 121 having a shape corresponding to an upper portion of the socket 110, and a coupling hole 122, through which a coupling member 123 for coupling to the lower clip 130 passes, are formed on the upper clip 120.

A lower support groove 131 having a shape corresponding to a lower portion of the sockets 110, a coupling protrusion 132 provided at a position corresponding to the coupling hole 122 so that the coupling member 123 is coupled, and the support groove 133 in which the support protrusion 115 formed in the socket body 111 is inserted and supported are formed on the lower clip 130. A support groove (not shown) corresponding to the support groove 133 formed in the lower clip 130 is also formed on the upper clip 120.

The socket 110 is provided in the upper support groove 121 of the upper clip 120 and the lower support grooves 131 of the lower clip 130 with a predetermined clearance. That is, the socket 110 is positioned on the lower clip 130 in a state of being mounted thereon by its own weight in a state in which the sockets 110 are not assembled with the plugs 210.

The upper cover 150 and the lower cover 160 are configured to support the socket body 111, the upper and lower clips 120 and 130 coupled to a circumference of the outer surface of the socket body 111, and the separating and coupling device 170 and improve a user's grip feeling and appearance.

The upper cover 150 is formed to surround the upper portion of the sockets 110, an opening portion 151 is formed in one side portion of the upper cover 150 so that the separating and coupling device 170 is lifted or lowered therethrough, and a plurality of coupling holes 152, to which a coupling member 166 for coupling to the lower cover 160 is coupled, and a first attachable/detachable protrusion 154 for inserting and coupling to the upper clip 120 are formed at a lower end portion of the upper cover 150.

Holes 155, through which a plurality of hoses connected to the hose insertion tubes 119 pass, are formed on the other side surface of the upper cover 150.

The lower cover 160 is formed to surround one side surface and the lower portion of the sockets 110, and a hole 161 is formed on one side of the lower cover 160 at a position corresponding to the hole 112 formed in the socket 110. One side portions 111c of the sockets 110 are mounted inside the holes 161 with a clearance G (see FIG. 3), and the sockets 110 may be supported by the clearance G to have a degree of freedom that allows the sockets 110 to be rotated and displaced within the clearance G range when an external force is applied.

Holes 162, through which a plurality of hoses connected to the hose insertion tubes 119 pass, are formed on the other side surface of the lower cover 160.

A second attachable/detachable protrusion 163 for inserting and coupling to the lower cover 160 and a plurality of coupling holes 164, through which the coupling member 166 for coupling to the upper cover 150, are formed on a bottom surface of the lower cover 160. Further, an insertion hole 165, in which an insertion protrusion 213c (see FIG. 12) formed in the plug 210 is accommodated, is formed at one side surface of the lower cover 160. The insertion protrusion 213c and the insertion hole 165 function to prevent the plugs 210 from being misassembled.

Figure 8A:
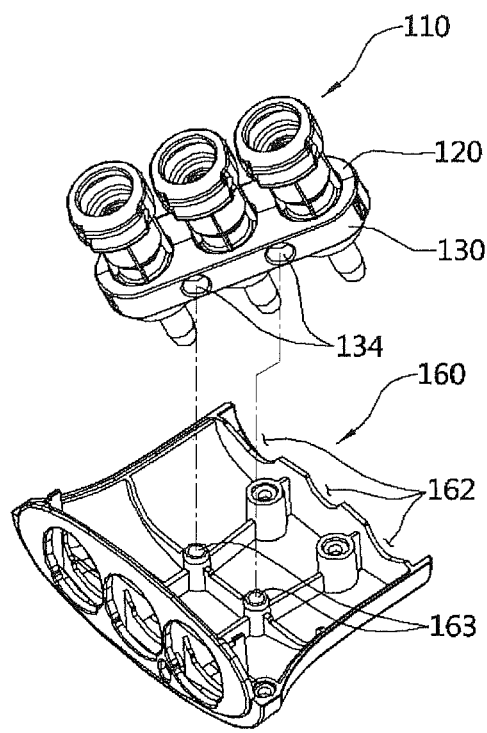
FIG. 8A is an exploded perspective view illustrating a coupling structure between a lower clip and a lower cover.
Figure 8B:
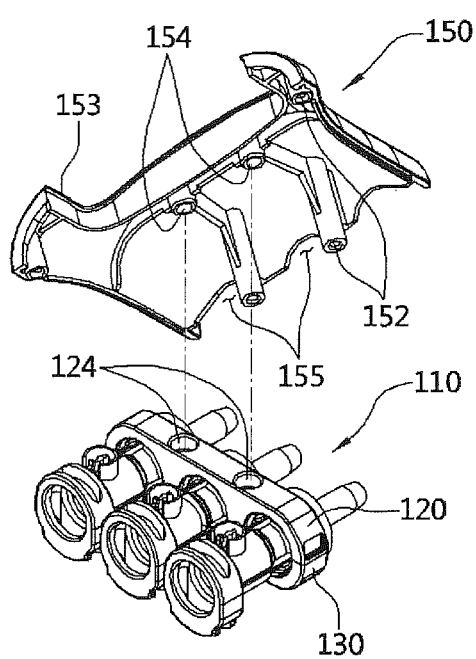
FIG. 8B is an exploded perspective view illustrating a coupling structure between an upper clip and an upper cover.
Figure 9:
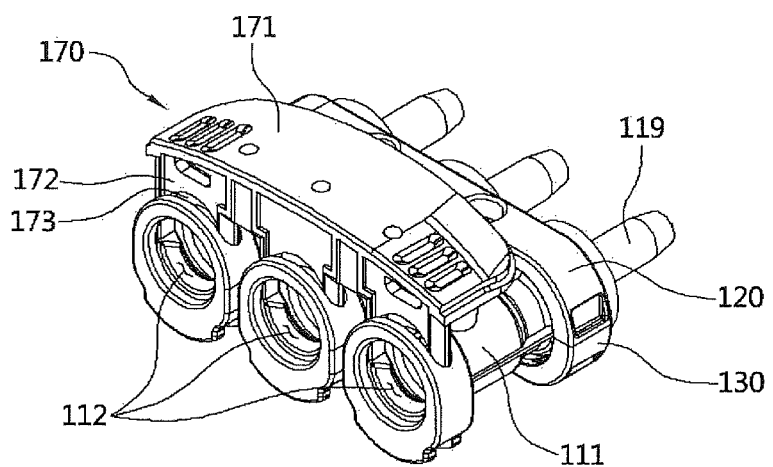
FIG. 9 is a perspective view illustrating a state in which the upper and lower clips and a separating and coupling device are coupled to sockets.
Figure 10:
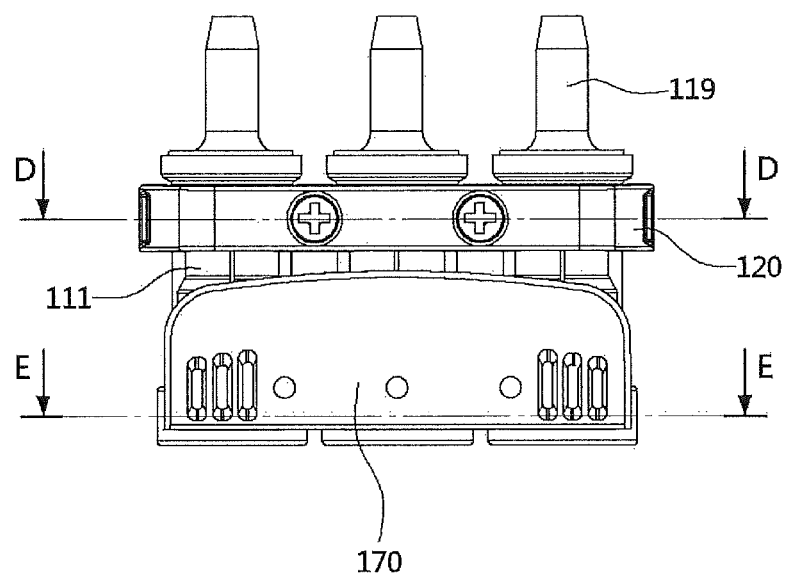
FIG. 10 is a plan view of FIG. 9.

Referring to FIG. 8A, a second attachable/detachable groove 134 to which the second attachable/detachable protrusion 163 formed on the lower cover 160 is detachably inserted and coupled is formed on the lower surface of the lower clip 130. Referring to FIG. 8B, a first attachable/detachable groove 124 to which the first attachable/detachable protrusion 154 formed on the upper cover 150 is detachably inserted and coupled is formed on the upper surface of the upper clip 120.

As described above, by configuring the upper clip 120 and the upper cover 150, and the lower clip 130 and the lower cover 160, to be assembled and separated in a detachable manner, an assembly in which the sockets 110 and the upper and lower clips 120 and 130 are assembled may be easily assembled to and separated from the upper cover 150 and the lower cover 160 in a detachable manner.

In this case, the one side portion 111c of the socket 110 is positioned on an inner surface of the hole 161 formed in the one side portion of the lower cover 160, and the second attachable/detachable protrusion 163 formed on the lower cover 160 is inserted into and coupled to the second attachable/detachable groove 134 formed in the lower clip 130, and then the first attachable/detachable protrusion 154 formed on the upper cover 150 is inserted into and coupled to the first attachable/detachable groove 124 formed in the upper clip 120 to easily fix the assembly in which the sockets 110 and the upper and lower clips 120 and 130 are assembled to the upper cover 150 and the lower cover 160.

The separating and coupling device 170 has a structure that allows a user to easily separate and couple the sockets 110 and the plugs 210 by pressing in a one-touch manner, and is configured to be held by the plugs 210 when the sockets 110 and the plugs 210 are assembled to each other and to release the holding state with the plugs 210 when the sockets 110 and the plugs 210 are separated from each other. To this end, the separating and coupling device 170 includes a pushing portion 171 and the locking portion 172 which extends downward from the pushing portion 171 and is provided to be lifted or lowered through the guide groove 113 formed in the socket 110. A hole 173 is formed in the locking portion 172 such that one side portion of the plug 210 passes through the hole 173, and an inclined surface 174 is formed in a lower end portion of the locking portion 172 positioned at a bottom of the hole 173.

Further, the pushing portion 171 is supported by the elastic member 140 so as to receive an elastic force in an upward direction. Both ends of the elastic member 140 are supported by the support groove 114 formed in the socket body 111 and a lower surface of the pushing portion 171.

Referring to FIG. 15, a step 172a is formed in the pushing portion 171 to limit an upward movement range of the pushing portion 171 while moving upward by being held by the holding protrusion 113a formed in the guide groove 113 which is formed on one side of the socket 110.

Referring to FIGS. 7 and 8, a step portion 175 is formed at an upper end of the pushing portion 171 and a holding portion 153, which is held by the step portion 175 to limit the upward movement range of the pushing portion 171, is formed at a lower end portion of the upper cover 150.

The operation of the separating and coupling device 170 will be described below.

As one example, the plugs 210 may include a first plug 210a, a second plug 210b, and a third plug 210c, which are formed in an integrated manner. The second plug 210b may be connected to the hot water supply tube (not shown) configured to supply the hot water from the hot-water circulation system toward the mat side, and the first plug 210a and the third plug 210c may be connected to first and second hot water return tubes (not shown) through which the hot water is returned to the hot-water circulation system side from the mat. However, the number of the plugs 210 and the structure in which the plugs 210 are connected to the hot water supply tube and the hot water return tubes may be changed according to the configuration of a boiler.

Referring to FIGS. 7, 11 and 12, the plugs 210 include a first plug body 211, which forms an exterior thereof and is positioned at one side portion of the plug 210, and the second plug body 213 positioned at the other side of the plug 210 and coupled to the first plug body 211. A hose insertion tube 212, which is inserted into a plurality of hoses for supplying and returning the hot water, is formed at one side portion of the first plug body 211. A sealing member coupling groove 214 is formed on the outer surface of the other side portion of the second plug body 213, and a sealing member 220 is coupled to the sealing member coupling groove 214 and brought into close contact with an inner surface of the socket 110 to prevent leakage of water when the sockets 110 and the plugs 210 are assembled to each other.

A sleeve tube 230, which is configured to open and close the flow path of the hot water and connected to the inner space 211b of the first plug body 211, is provided on an inner side of the second plug body 213.

A holding protrusion 213a is formed on the inner surface of the second plug body 213, and a sealing member 240 is coupled to an outer surface of one side portion of the sleeve tube 230 and brought into close contact with the holding protrusion 213a to maintain the watertightness. A holding protrusion 211a is formed on an inner surface of the first plug body 211, a flange-shaped holding portion 231 is formed on the outer circumferential surface of one side portion of the sleeve tube 230, and an elastic member 250 having both ends supported by the holding protrusion 211a and the holding portion 231 is provided therebetween. The other side end of the sleeve tube 230 is open, and an opening portion 230b for communicating the hot water is formed in the other side portion region of the sleeve tube 230. The other side end of the sleeve tube 230 is provided such that the other side end of the sleeve tube 230 is positioned to protrude from the other side end of the second plug body 213 to the other side by a predetermined length in a state in which the sockets 110 and the plugs 210 are separated from each other.

The operation of opening and closing the flow path by the sleeve tube 230 will be described below.

Hereinafter, the operation of separating and coupling the sockets 110 and the plugs 210 will be described with reference to FIGS. 11 and 12.

First, referring to FIG. 12, in a state in which the sockets 110 and the plugs 210 are separated from each other, the opening/closing member 116 provided on the inner side of the socket body 111 is in a state of being pressed by an elastic force of the elastic member 118 in a direction toward one side. Here, the sealing member 117 coupled to the opening/closing member 116 is brought into close contact with the holding protrusion 111a formed on the inner surface of the socket body 111 so that fluid communication between the inner space 111b of the socket body 111 and an inner space 119a of the hose insertion tube 119 is interrupted to prevent the hot water in the hose insertion tube 119 from leaking to the outside of the first connector 100.

Further, in a state in which the sockets 110 and the plugs 210 are separated from each other, the sleeve tube 230 provided on the inner side of the second plug body 213 is in a state of being pressed by an elastic force of the elastic member 250 in a direction toward the other side. Here, the sealing member 240 coupled to the sleeve tube 230 is brought into close contact with the holding protrusion 213a formed on the inner surface of the second plug body 213 so that fluid communication between the inner space 211b of the first plug body 211 and an inner space 230a of the sleeve tube 230 is interrupted to prevent the hot water in the hose insertion tube 212 from leaking to the outside of the second connector 200.

Referring to FIG. 11, when the sockets 110 and the plugs 210 are assembled to each other, the second plug body 213 of the plug 210 is inserted in a direction toward the other side through the holes 161 and 112 formed in one side portion of the socket 110. Here, an outer surface of the second plug body 213 is inserted along the inner surface of the socket body 111. When the second plug body 213 is further pushed to the other side from the position in which the other side end of the sleeve tube 230, which is at the position protruding from the other side end of the second plug body 213 to the other side, starts to contact the one side surface of the holding portion 116a, the opening/closing member 116 of the socket 110 is pushed to the other side, which is a direction in which the sleeve tube 230 is inserted, and the sleeve tube 230 of the plug 210 is pushed to one side by a repulsive force of the opening/closing member 116. Here, the elastic member 118 at a circumference of the opening/closing member 116 and the elastic member 250 at one side of the sleeve tube 230 are in a compressed state, the sealing member 117 coupled to the opening/closing member 116 is spaced toward the other side of the holding protrusion 111a, and the sealing member 240 coupled to the sleeve tube 230 is spaced toward one side of the holding protrusion 213a.

When the second plug body 213 is inserted into the inner surface of the socket body 111, the inclined surface 174, which is formed at the lower end portion of the locking portion 172 of the separating and coupling device 170, contacts the second plug body 213 to be pressed downward so that the pushing portion 171 and the locking portion 172 are moved downward together. Further, when the second plug body 213 is inserted to a position in which the lower end portion of the locking portion 172 corresponds to a holding groove 213b of the second plug body 213, a lower end portion of the separating and coupling device 170 is moved upward by the elastic force of the elastic member 118 and held by the holding groove 213b so that the sockets 110 and the plugs 210 are assembled to each other and maintained in a locked state.

In FIG. 11, arrows indicate the flow path of the hot water.

When a user intends to separate the plugs 210 from the sockets 110 in a state in which the plugs 210 and the sockets 110 are assembled to each other, the user presses downward on the pushing portion 171 of the separating and coupling device 170 in a one-touch manner so that the lower end portion of the locking portion 172 comes out to the lower side of the holding groove 213b. Here, the plugs 210 are pushed out in one direction due to a restoration force of the elastic members 118 and 250 so that the plugs 210 are in a state of being detachable to the outside of the sockets 110.

Hereinafter, referring to FIGS. 13 to 15, the operation, in which the leakage of water is prevented as the sockets 110 and the plugs 210 are normally assembled even when the degrees of parallelism of the plugs 210 are changed, will be described.

Figure 13:
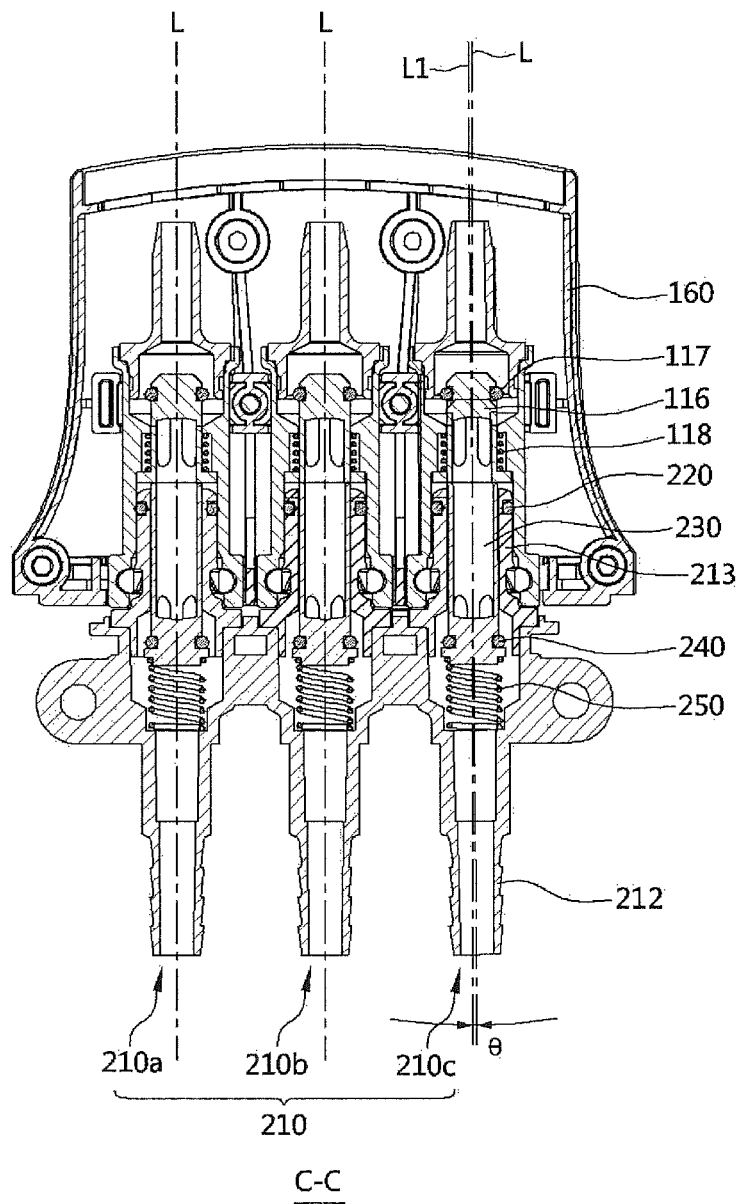
FIG. 13 is a cross-sectional view taken along line C-C of FIG. 5 illustrating an operation in which leakage of water is prevented as the sockets and plugs are normally assembled even when degrees of parallelism of the plugs are changed.

Referring to FIG. 13, a case in which the degrees of parallelism of the plugs 210 are changed indicates that the plug 210c which is a part of the plurality of plugs 210a, 210b and 210c is inclined by a predetermined angle θ in one direction L1 with respect to a parallel direction L. In a case in which the degrees of parallelism of the plugs 210a, 210b, 210c do not coincide with each other, when the plugs 210 are assembled to the hot-water circulation system using a fastening member such as a bolt, coupling strength at a plurality of coupling points may not be constant resulting in an assembly tolerance in which deformation occurs in some plugs or manufacturing tolerance of the plugs 210.

Figure 1:
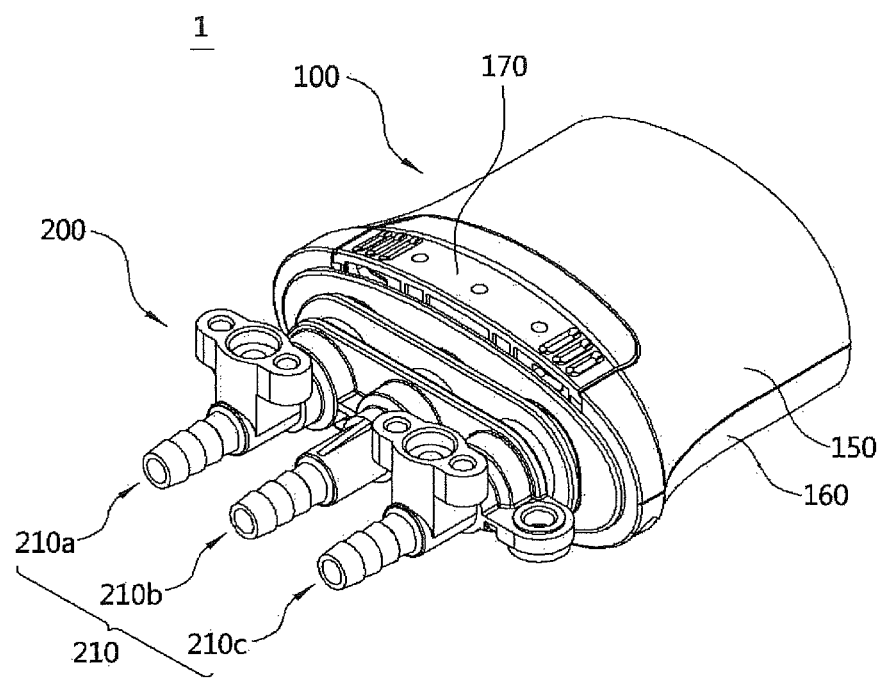
FIG. 1 is a perspective view of a connector assembly for hose connection of a hot water mat according to the present invention.
Figure 2:
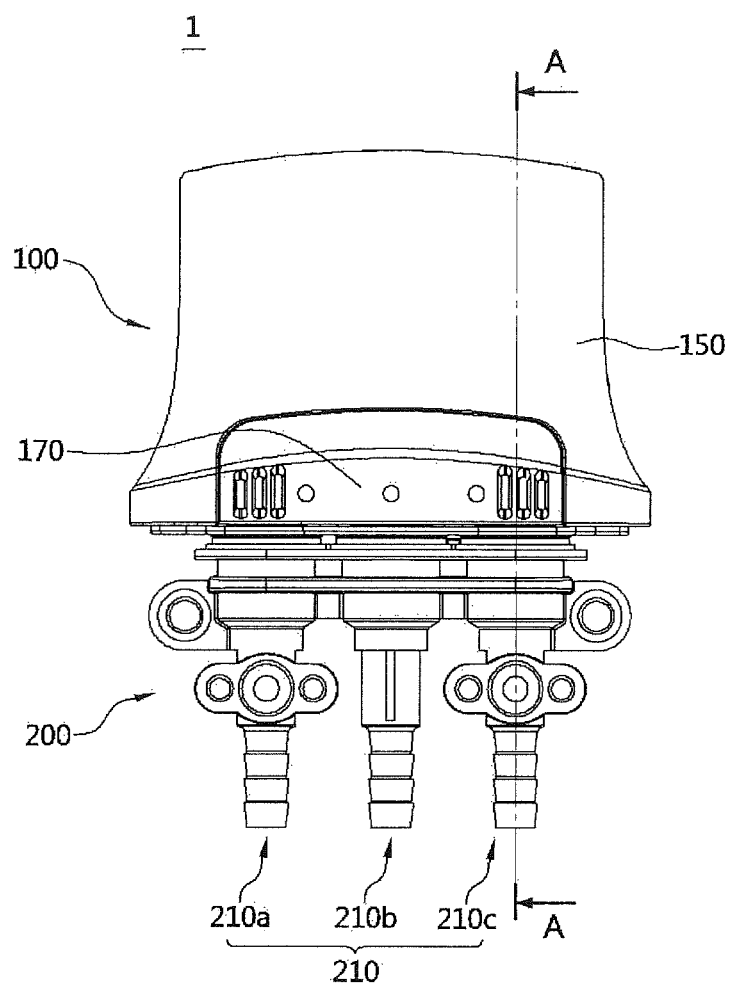
FIG. 2 is a plan view of FIG. 1.
Figure 3:
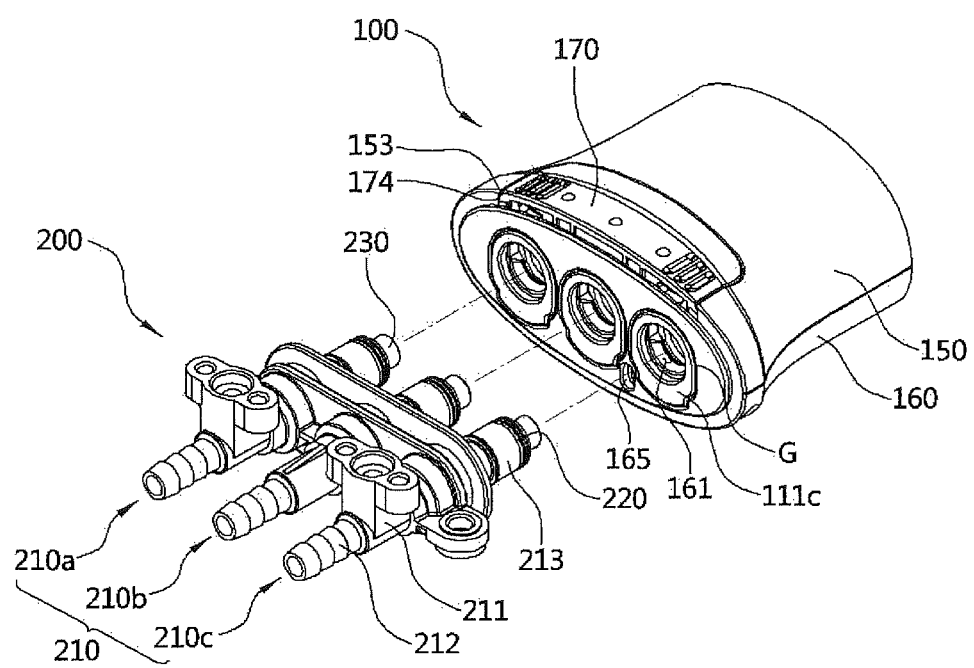
FIG. 3 is a perspective view illustrating a state in which a first connector and a second connector of the connector assembly for hose connection of a hot water mat according to the present invention are separated.
Figure 4:
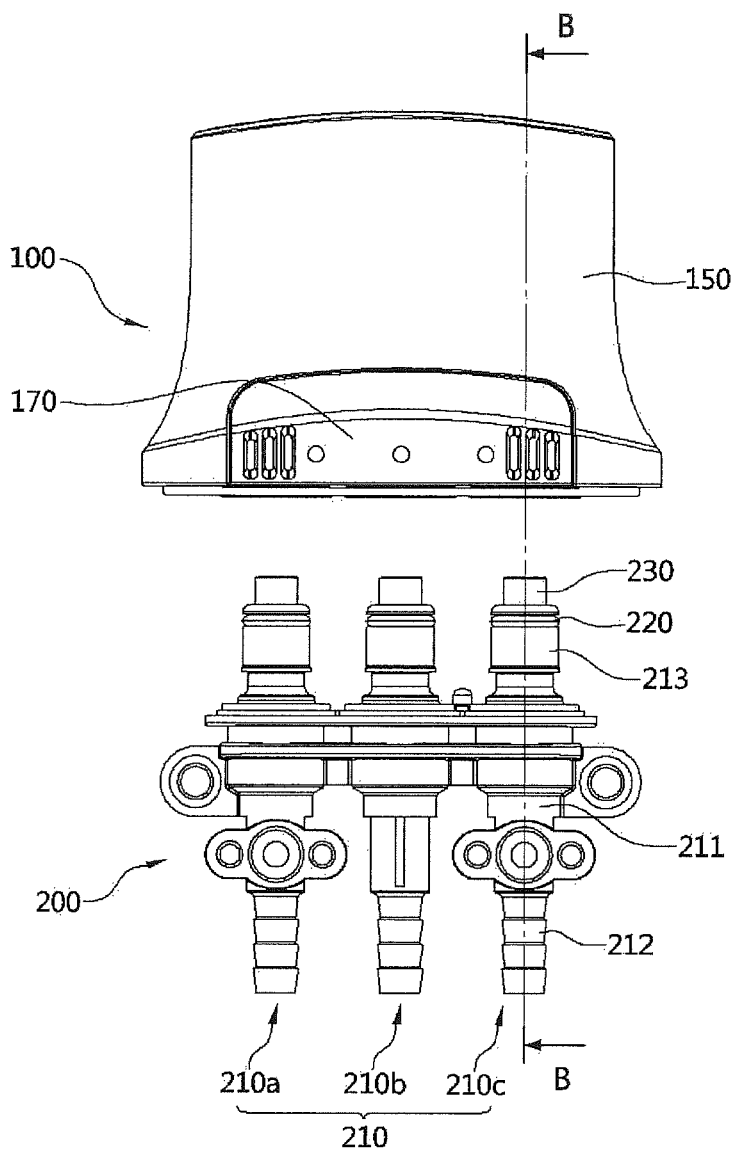
FIG. 4 is a plan view of FIG. 3.
Figure 5:
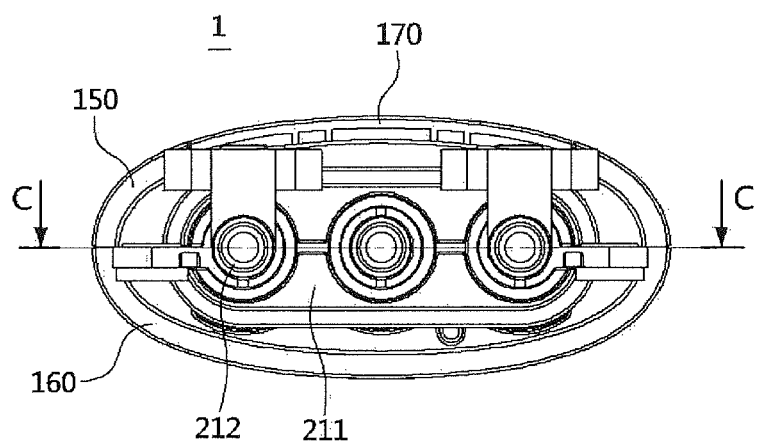
FIG. 5 is a front view of FIG. 1.
Figure 6:
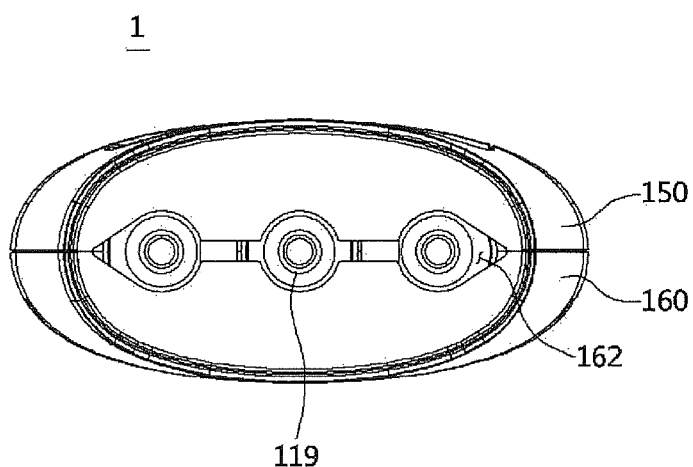
FIG. 6 is a rear view of FIG. 1.

In the present invention, the connector assembly is configured such that the predetermined clearances G1 and G2 are formed between the outer surface of the socket body 111 of the socket 110 and the inner surfaces of the upper and lower clips 120 and 130 as shown in FIG. 14, the predetermined clearance G3 is formed between the guide groove 113 of the socket body 111 and the outer surface of the locking portion 172 of the separating and coupling device 170 as shown in FIG. 15, and one side portion 113d of the socket body 111 is positioned with the clearance G on an inner side of the hole 161 formed in one side portion of the lower cover 160 as shown in FIG. 3, so that each of the plurality of sockets 110 (110a, 110b, and 110c) formed in a detachable manner is configured to have a degree of freedom. Here, 'degree of freedom' means that the socket 110 may be rotated and displaced by a predetermined angle in any direction within the range of the clearances G1, G2 and G3.

That is, in a case in which the plug 210 is inserted into and assembled to the socket 110, the second plug body 213 of the plug 210 is inserted into the inner space 111b of the socket body 111 and brought into contact with the inner surface of the socket body 111 to apply a force on the socket 110, and when an external force is applied, the socket 110 is in a state of being capable of rotating and being displaced within the range of the clearances G, G1, G2 and G3. Accordingly, the socket 110 is rotated and displaced in the direction of the force acting when the plug 210 is inserted so that the socket 110 may be aligned in a direction parallel to the inserting direction of the plug 210.

As described above, by forming the plurality of sockets 110 in a detachable manner and applying the degree of freedom to each of the sockets 110a, 110b, and 110c, even when the degrees of parallelism of the plurality of plugs 210 do not coincide with each other, the socket 110c, which is to be assembled in correspondence with the plug 210c whose degree of parallelism is changed, is automatically aligned in a direction parallel to the plug 210c whose degree of parallelism is changed due to the degree of freedom so that the entire area of the sealing member 220 is pressed uniformly on the inner surface of the socket body 111, thereby surely preventing a leakage phenomenon.

According to a connector assembly for hose connection of a hot water mat according to the present invention, by forming a plurality of sockets in a detachable manner and configuring each socket to have a degree of freedom within a clearance range, even when degrees of parallelisms of a plurality of plugs do not coincide with each other, the socket, which is to be assembled in correspondence with the plug whose degree of parallelism is changed, is automatically aligned in a direction parallel to the plug so that the entire area of a sealing member coupled to the plug side is pressed uniformly on an inner surface of the socket body, thereby surely preventing a leakage phenomenon.

As described above, the present invention is not limited to the above-described exemplary embodiments, variations and modifications may be made by a person of ordinary skill in the art to which the present invention pertains without departing from the scope of claims of the present invention, and such variations and modifications fall within the scope of the present invention.

| [Description of Reference Numerals] | |
|---|---|
| 1: connector assembly | 100: first connector |
| 110: socket | 111: socket body |
| 112: hole | 113: guide groove |
| 113a: holding protrusion | 114: support groove |
| 115: support protrusion | 116: opening/closing member |
| 117: sealing member | 118: elastic member |
| 119: hose insertion tube | 120: upper clip |
| 121: upper support groove | 122: coupling hole |
| 123: coupling member | 124: first attachable/detachable groove |
| 130: lower clip | 131: lower support groove |
| 132: coupling protrusion | 133: support groove |
| 134: second attachable/ detachable groove | 140: elastic member |
| 150: upper cover | 151: opening portion |
| 152: coupling hole | 153: holding portion |
| 154: first attachable/ detachable protrusion | 160: lower cover |
| 161, 162: hole | 163: second attachable/detachable protrusion |
| 164: coupling hole | 165: insertion hole |
| 166: coupling member | 170: separating and coupling device |
| 171: pushing portion | 172: locking portion |
| 172a: step | 173: hole |
| 174: inclined surface | 175: step portion |
| 200: second connector | 210: plug |
| 211: first plug body | 212: hose insertion tube |
| 213: second plug body | 214: sealing member coupling groove |
| 220: sealing member | 230: sleeve tube |
| 240: sealing member | 250: elastic member |
| G, G1, G2, G3: clearance | |

What is claimed is:

1. A connector assembly for hose connection of a hot water mat, comprising:
    a plurality of sockets connected to a plurality of hoses through which hot water is supplied and returned, and formed in a detachable structure;
    clips provided outside the plurality of sockets with a clearance to support the plurality of sockets so as to have a degree of freedom;
    a plurality of plugs formed in an integrated structure and connected to the plurality of hoses through which the hot water is supplied and returned are detachably inserted into and assembled to the plurality of sockets; and
    a plurality of sealing members coupled to outer surfaces of the plurality of plugs to prevent leakage of water by being in close contact with the inner surfaces of the plurality of sockets when the plurality of sockets and the plurality of plugs are assembled to each other,
    wherein when the plurality of sockets and the plurality of plugs are assembled to each other, the plurality of sockets connected to the plurality of plugs are displaced in a direction parallel to the plurality of plugs due to the degree of freedom and assembled in an aligned state, and the entire area of the sealing members is pressed to the inner surfaces of the plurality of sockets to a uniform degree to prevent leakage,
    wherein the clips include an upper clip provided along a circumference of an upper outer surface of the plurality of sockets and a lower clip provided along a circumference of a lower outer surface of the plurality of sockets and coupled to the upper clip.

2. The connector assembly of claim 1, wherein an upper support groove is formed in the upper clip and supports the upper outer surface of the plurality of sockets with a clearance, and
    a lower support groove is formed in the lower clip and supports the lower outer surface of the plurality of sockets with a clearance.

3. The connector assembly of claim 1, wherein a support protrusion is formed on an outer surface of the plurality of sockets, and
    a support groove, into which the support protrusion is inserted with a clearance, is formed in the clips.

4. The connector assembly of claim 1, further comprising an upper cover configured to cover the upper clip and an upper portion of the socket, and
    a lower cover configured to cover the lower clip and a lower portion of the socket, and coupled to the upper cover.

5. The connector assembly of claim 4, wherein one side portion of the plurality of sockets is mounted on an inner surface of a hole formed in one side portion of the lower cover with a clearance.

6. The connector assembly of claim 4, wherein a first attachable/detachable groove and a first attachable/detachable protrusion, which are detachably formed on the upper clip and the upper cover at positions corresponding to each other, are inserted into and coupled to each other.

7. The connector assembly of claim 4, wherein a second attachable/detachable groove and a second attachable/detachable protrusion, which are detachably formed on the lower clip and the lower cover at positions corresponding to each other, are inserted into and coupled to each other.

8. The connector assembly of claim 1, further comprising a separating and coupling device which is held by the plurality of plugs when the plurality of sockets and the plurality of plugs are assembled to each other and releases the holding state with the plurality of plugs when the plurality of sockets and the plurality of plugs are separated from each other.

9. The connector assembly of claim 8, wherein the separating and coupling device includes a pushing portion, and a locking portion extending from the pushing portion, provided to be lifted or lowered through the plurality of sockets, and formed with a hole through which one side portion of the plurality of plugs passes.

10. The connector assembly of claim 9, wherein the locking portion is inserted into a guide groove, which is formed in the plurality of sockets, with a clearance so that the plurality of sockets are supported with a degree of freedom.

11. The connector assembly of claim 10, wherein when the pushing portion is moved upward, a lower end portion of the locking portion positioned at a bottom of the hole is held by a holding groove formed on an outer surface of the plurality of plugs to maintain a state in which the plurality of sockets and the plurality of plugs are assembled to each other, and
    when the pushing portion is moved downward, the lower end portion of the locking portion is moved to an outside of the holding groove so that the plurality of sockets and the plurality of plugs are in a detachable state.

12. The connector assembly of claim 11, wherein the pushing portion is supported by an elastic member so as to receive an elastic force in an upward direction, and
    a step is formed in the pushing portion to limit an upward movement range of the pushing portion while moving upward by being held by a holding protrusion formed in the guide groove formed at one side of the sockets.

13. The connector assembly of claim 12, wherein the pushing portion is supported by the elastic member so as to receive the elastic force in the upward direction, and
    the pushing portion is held by the upper cover while moving upward so that the upward movement range of the pushing portion is limited.

14. The connector assembly of claim 12, wherein an inclined surface is formed on the lower end portion of the locking portion, and when the sockets and the plugs are assembled to each other, the outer surface of the plug is moved along the inclined surface and the lower end portion of the locking portion is moved upward by the elastic force of the elastic member and held by the holding groove.

* * * * *